W. SCHOCH.
Carriage Top.

No. 99,601. Patented Feb. 8, 1870.

Witnesses:
Gustave Dieterich
Edgar Tate

Inventor:
W. Schoch
Per    Attorneys.

United States Patent Office.

WILLIAM SCHOCH, OF PLUMSTEADVILLE, PENNSYLVANIA.

Letters Patent No. 99,601, dated February 8, 1870.

IMPROVEMENT IN CARRIAGE-TOPS.

The Schedule referred to in these Letters Patent and making part of the same.

*To all whom it may concern:*

Be it known that I, WILLIAM SCHOCH, of Plumsteadville, in the county of Bucks, and State of Pennsylvania, have invented a new and improved Carriage-Top; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
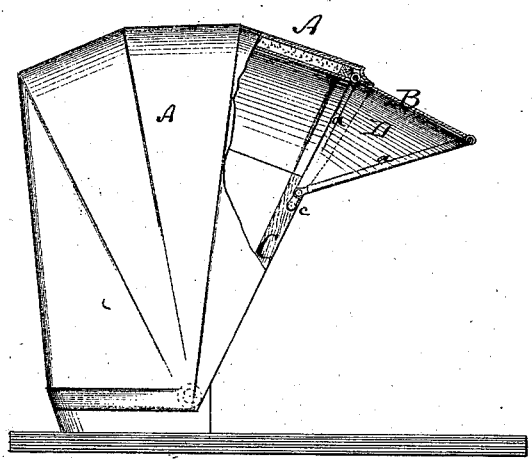
Figure 1 represents a sectional side view of my improved carriage-top.

This invention has for its object to so construct a carriage-top, that the forward projecting fly or "shoot" on the same, can be taken out of the way, when it is not required as protection against rain or light.

The invention consists in the application, to a carriage-top, of a removable jointed fly or "shoot," which can, when not used, be taken off the top, folded together, and packed away under a seat, or in any other desired place.

A, in the drawing, represents a carriage-top of ordinary or suitable construction.

B is the fly or "shoot," projecting forward from the front of A, to serve as additional protection against rain or the rays of the sun.

Figure 2:
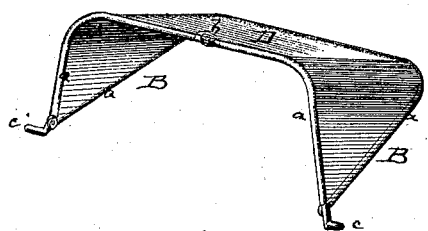
Figure 2 is a perspective view of the fly-attachment.
Figure 3:
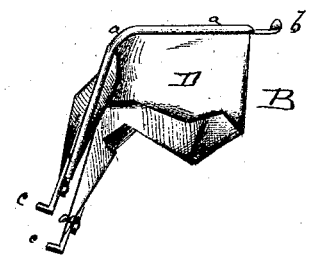
Figure 3 is a side view of the same, showing it folded together.

The frame of the fly consists of two or more hoops *a a*, which are pivoted together, at their lower ends, and of which each has one or more joints *b*, as in fig. 2. The frame can thus be folded together in the manner shown in fig. 3, or, if more joints are in its hoops, into a still smaller compass.

The lower end of the frame carries outward-projecting hoops *c c*, which fit into sockets of the front hoop C, of the carriage-top. Other means of attaching the fly may, however, be provided.

The covering D, of the fly, is of suitable flexible material, and may, if desired, be stretched by transverse braces in the frame.

The fly, when not used, is taken off the carriage-top and folded together. When to be used, it can be readily applied.

I do not confine myself to a peculiar form or style of fly or "shoot," nor to the construction of the carriage-top, to which the same is to be secured; but having thus described my invention, I do claim, and desire to secure by Letters Patent—

A removable jointed fly or "shoot," for a carriage-top, arranged substantially as herein shown and described.

The above specification of my invention signed by me, this 28th day of December, 1869.

WM. SCHOCH.

Witnesses:
GEO. W. MABEE,
ALEX. F. ROBERTS.